United States Patent
Yeh et al.

(10) Patent No.: US 9,079,633 B2
(45) Date of Patent: Jul. 14, 2015

(54) UNI-WHEEL PERSONAL MOBILITY VEHICLE WITH SELF-BALANCING FUNCTION

(71) Applicant: National Tsing Hua University, Hsinchu (TW)

(72) Inventors: Ting-Jen Yeh, Hsinchu (TW); Chun-Feng Huang, Hsinchu (TW); Jian-Hao Hong, Hsinchu (TW)

(73) Assignee: National Tsing Hua University (TW)

( * ) Notice: Subject to any disclaimer, the term of this patent is extended or adjusted under 35 U.S.C. 154(b) by 0 days.

(21) Appl. No.: 14/199,988

(22) Filed: Mar. 6, 2014

(65) Prior Publication Data

US 2014/0251708 A1  Sep. 11, 2014

(30) Foreign Application Priority Data

Mar. 7, 2013 (TW) .............................. 102108020 U

(51) Int. Cl.
*B62K 17/00* (2006.01)
*B62M 6/50* (2010.01)
*B62K 1/00* (2006.01)
*B62K 3/00* (2006.01)
*B62M 6/45* (2010.01)
*B62M 6/40* (2010.01)

(52) U.S. Cl.
CPC .. *B62M 6/50* (2013.01); *B62K 1/00* (2013.01); *B62K 3/007* (2013.01); *B62M 6/40* (2013.01); *B62M 6/45* (2013.01)

(58) Field of Classification Search
CPC ............ B62M 6/40; B62M 6/45; B62M 6/65; B62K 1/00
USPC ................................ 180/206.3, 65.1; 280/205
See application file for complete search history.

(56) References Cited

U.S. PATENT DOCUMENTS

| | | | |
|---|---|---|---|
| 2011/0056757 A1* | 3/2011 | Polutnik | 180/65.51 |
| 2011/0175319 A1* | 7/2011 | Chen | 280/205 |
| 2011/0181014 A1* | 7/2011 | Ryan et al. | 280/263 |
| 2012/0175176 A1* | 7/2012 | Hamaya et al. | 180/21 |

* cited by examiner

*Primary Examiner* — Joseph Rocca
*Assistant Examiner* — Marlon Arce

(57) ABSTRACT

Uni-wheel personal mobility vehicle with self-balancing function is disclosed. This transportation device can be pedaled by a driving force provided by the driver's manpower and/or the in-wheel motor's electric power. The uni-wheel personal mobility vehicle with self-balancing function is equipped with an inertial sensing and control driving module, an in-wheel motor, and a steering mechanism consisting of a transmission pulley set, an idle pulley set, a transmission cable, and a spring set, therefore the personal mobility vehicle can simultaneously maintain its self balance when being propelled by driver's pedaling force or the in-wheel motor's electrical torque; moreover, the driver can also make the personal mobility electric vehicle change its direction by rotating a handlebar similar to steering a bicycle, wherein the rotation of the handlebar would simultaneously pull one side of the transmission cable via the transmission pulley set to steer the vehicle and maintain its lateral balance.

10 Claims, 5 Drawing Sheets

UNI-WHEEL PERSONAL MOBILITY VEHICLE WITH SELF-BALANCING FUNCTION

BACKGROUND OF THE INVENTION

1. Technical Field

The present invention relates to a uni-wheel personal mobility vehicle which possesses self-balancing function and is especially equipped with an inertial sensing and control driving module, an in-wheel motor, and a steering mechanism consisting of a transmission pulley set, an idle pulley set, a transmission cable, and a spring set.

2. Description of Related Art

The prototype of a bicycle is first appeared in the manuscript designed by Leonardo da Vinci, however, the entity of the bicycle is manufactured in the end of the eighteenth century. After near hundred years' evolutions, truly modern form of the bicycle was born in 1874, British Roson designed and mad a bicycle with a roller chain and sprockets; thereafter, in 1886, the United Kingdom John. K. Stahly designed a new style bicycle fitted with a fork and brakes, the sizes of the front and the rear wheel of the new style bicycle were the same in order to maintain balance, moreover, rubber wheels were first adapted in the new style bicycle of Stahly, such that, Stahly is later known as the "father of a bike". In 1888, Ireland's veterinary Dunlop, who mounted an inflatable rubber into the bicycle wheels such that the bicycle wheels were inflatable, Dunlop made the bicycle more complete.

In the early human history, bicycle was one of the main personal mobility vehicles, however, with the advancement of industrialization and technology, various medium and large vehicles such as motorcycles having an internal combustion engine to produce larger power, are gradually becoming the main stream of personal mobility vehicles. Recently, the increasing concern over the environmental impact of the internal combustion engine vehicles, along with the soaring of oil prices, has provided a compelling impetus to develop clean, efficient, and sustainable vehicles. Among the possible actuators for implementing such vehicles, electric motors are considered to be the most viable ones due to their zero-emission nature. Vehicles driven by electric motors are referred to as EVs. EVs appear in the forms of electric buses, electric cars, and so on. They have the potential to curb the pollution problem in an efficient way.

In densely populated urban environments, EVs for personal mobility purposes are increasingly accepted as capable, even appealing, forms of transportation, Vehicles in this category include electric bicycles, electric kick scooters, electric motorcycles, and electric scooters. Following the recent advances in digital computers, sensor and actuator technology, and control theory, researchers now have the opportunity to contemplate radically new concepts for the personal mobility EVs of next generation.

One of the innovative products is Segway, the personal transporter invented by Dean Kamen. Segway is basically a two-wheel inverted pendulum. The equipped control system regulates the total and the differential torques on the motored wheels to keep the transporter balanced, moving forward and backward, and making turns based on the posture of the rider standing on the chassis. Segway's distinct features including zero turning radius and small footprint make it very suitable for providing transportation needs in tight spaces or highly traffic areas. Since the release of Segway, several vehicles with the structure of a wheeled inverted pendulum have been developed. Examples include the B2 vehicle, Toyota's winglet, Honda's U3-X, Enicycle and so on. It is worth mentioning that, unlike Segway's two-wheel structure, both Enicycle and U3-X are similar to pedalless unicycles.

The main power of Segway, Enicycle and U3-X is electricity, which is mostly obtained by burning fossil fuels. They are not like bicycles that the propulsion power comes the rider's manpower without using any natural resources. In view of this, the inventor of the present application has made great efforts to make innovative research to develop a uni-wheel personal mobility vehicle with the self-balancing function and the ability to incorporate man power for propulsion.

BRIEF SUMMARY OF THE INVENTION

The primary objective of the present invention is to propose a uni-wheel personal mobility vehicle which possesses self-balancing function and is especially equipped with an inertial sensing and control driving module, an in-wheel motor, and a steering mechanism consisting of a transmission pulley set, an idle pulley set, a transmission cable, and a spring set, therefore the personal mobility vehicle can simultaneously maintain its self balance when being propelled by driver's pedaling force or the in-wheel motor's electrical torque; moreover, the driver can also make the personal mobility electric vehicle change its direction by rotating a handlebar similar to steering a bicycle, wherein the rotation of the handlebar would simultaneously pull one side of the transmission cable via the transmission pulley set to steer the vehicle and maintain its lateral balancing.

Accordingly, to achieve the above-mentioned objective, the inventor proposes a uni-wheel personal mobility vehicle with self-balancing function, comprises:

an upper frame, comprising: a handlebar, having a main shaft first end and a main shaft second end, wherein the main shaft first end is connected with a handle portion; a horizontal extension rod, having an extension rod first end and an extension rod second end, wherein the extension rod first end is connected to the main shaft second end; a seat member, disposed on the extension rod second end through a supporting member, used for providing a driver to sit; a supporting rod, having a supporting rod first end and a supporting rod second end, wherein the supporting rod first end is connected to the extension rod second end; and an extension member, being connected to the supporting rod;

a lower frame, connected to the upper frame and comprising: a supporting frame, connected to the supporting rod second end, and downward extending from the supporting rod second end; and a pivot shaft, disposed in the extension member and pivotally connected to the supporting frame.

a wheel, being pivotally connected to the supporting frame and consisting of an in-wheel motor, wherein the in-wheel motor is assembled with a first sprocket wheel thereon, and the first sprocket wheel is a ratchet wheel;

a second sprocket wheel, being pivotally connected to the supporting frame and adjacent to the wheel, wherein the first sprocket wheel and the second sprocket wheel mesh with a roller chain;

a pedal assembly, being pivotally connected to the second sprocket wheel and the supporting frame, wherein applying a force to the pedal assembly is able to make the second sprocket wheel and the first sprocket wheel rotate, so as to provide a driving force to the wheel; when the wheel is electrically driven by the in-wheel motor, the pedal assembly and the second sprocket wheel will not be rotated because the first sprocket wheel is a ratchet wheel.

a transmission pulley set, comprising: a first transmission pulley, a second transmission pulley, and a third transmission pulley, wherein the second transmission pulley and the third transmission pulley are coaxial and are pivotally connected to the horizontal extension rod; the first transmission pulley and the second transmission pulley are connected by a belt. The transmission pulley set is connected between the handlebar and the horizontal extension rod;

an idle pulley set, being disposed under the supporting rod and connected to the transmission pulley set through the transmission cable; the direction of the transmission cable is changed by the idle pulley set so that either end of the cable can be connected to the spring set a transmission cable set, connecting the two springs in the spring set, is wrapped around the idle pulley set and the third transmission pulley set, a spring set, consisting of two springs on either side of the frame, and connecting the transmission cable to the supporting frame, is used for applying a pre-tension force to the transmission cable, so as to maintain the tension of the transmission cable; and an inertial sensing and control driving module, being disposed on the supporting rod and electrically connected to the in-wheel motor;

wherein the inertial sensing and control driving module would automatically detect the change of a forward and backward tilt angle and a forward and backward angular velocity of the upper frame and the lower frame, and then controls the in-wheel motor to output a balance torque and an auxiliary torque for maintaining the forward and backward balance of the upper frame and the lower frame; moreover, after the driver holds the control the handle portion and rotates the handlebar, the handlebar would simultaneously rotate the transmission pulley set according to the steering torque applied by the driver, and then one side of the transmission cable is pulled by the rotation of the transmission wheel set; therefore, the corresponding spring in the spring set is pulled by the rotation of the pulley set due to the pulling force make by the transmission cable, and then the spring set transmits the steering torque to the supporting frame for rotating the upper frame relative to the lower frame through the pivot shaft, so as to make the wheel incline to one side. As a result, the inclination of the wheel and the relative rotation between upper frame and lower frame make the personal mobility vehicle change direction by a way similar to steering a conventional bicycle.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe the uni-wheel personal mobility with self-balancing function according to the present invention, embodiments of the present invention will be described in detail with reference to the attached drawings hereinafter.

Figure 1:
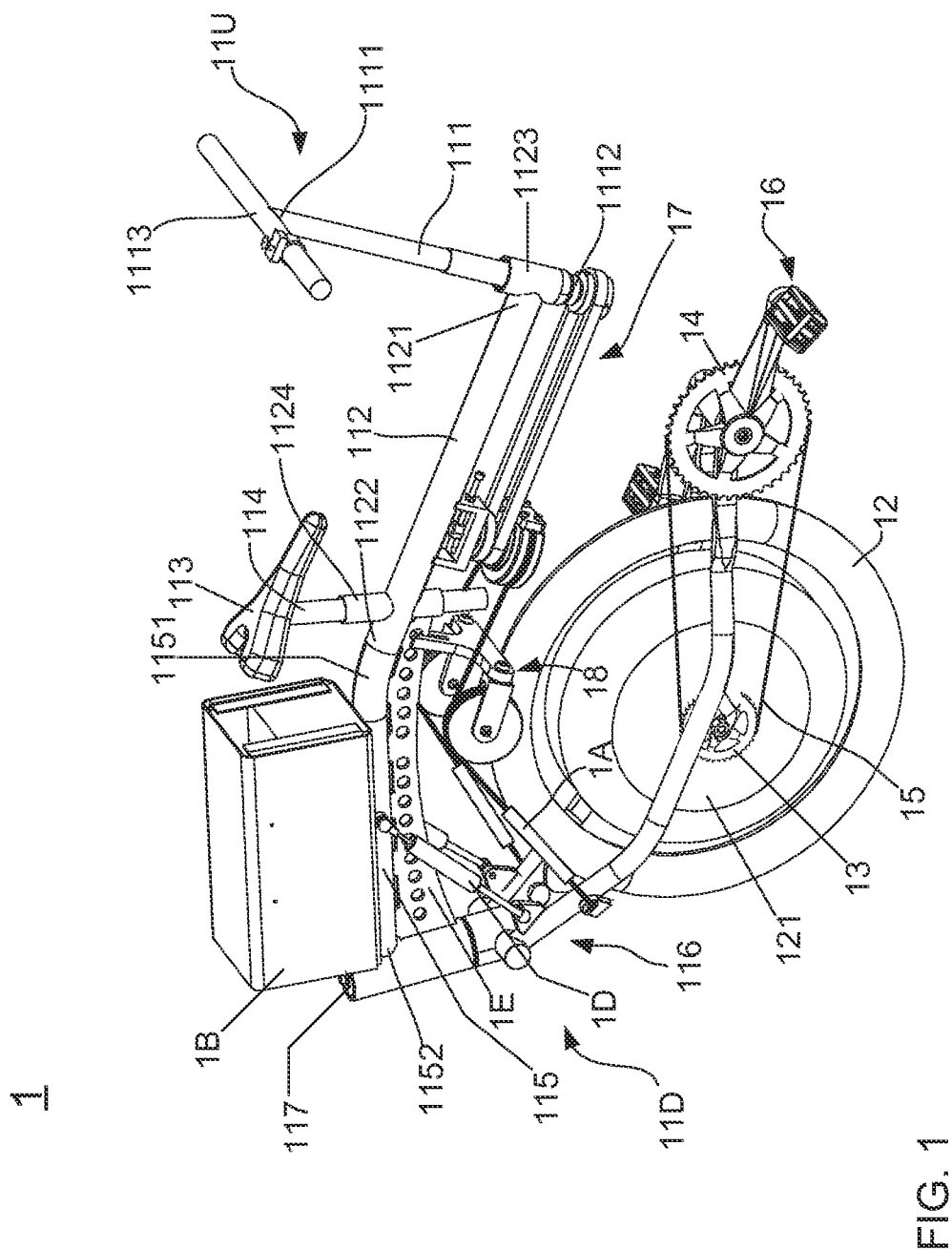
FIG. 1 is a framework diagram of the uni-wheel personal mobility with self-balancing function according to the present invention.

With reference to FIG. 1, which illustrates a framework diagram of the uni-wheel personal mobility with self-balancing function according to the present invention, the personal mobility vehicle 1 of the present invention consists of: an upper frame 11U, a lower frame 11D, a wheel 12, a first sprocket wheel 13, a second sprocket wheel 14, a pedal assembly 16, a transmission pulley set 17, an idle pulley set 18, a transmission cable 184, a spring set 1A, an inertial sensing and control module 1B, and two pneumatic springs 1D.

Figure 2:
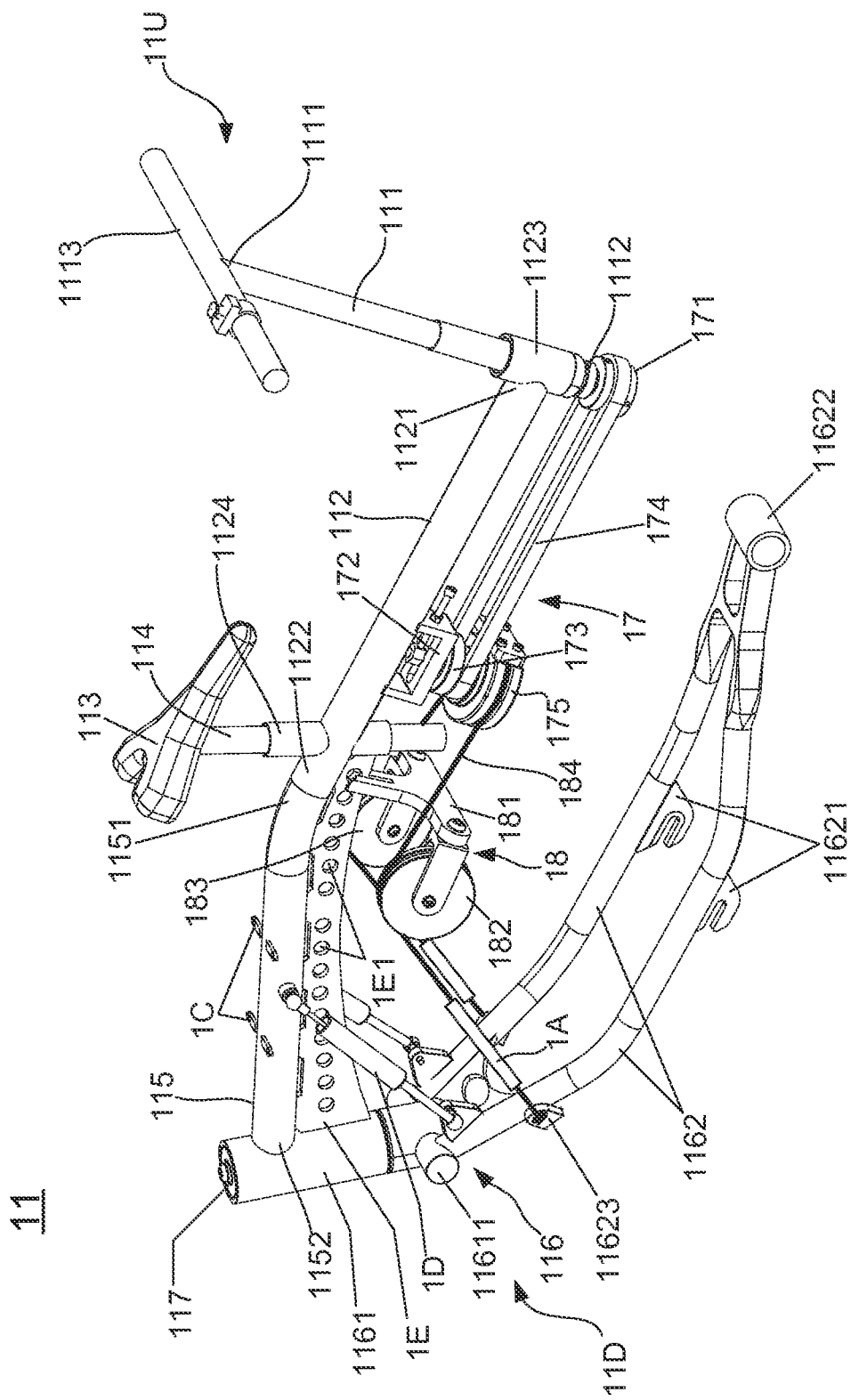
FIG. 2 is a framework diagram of a main body of the uni-wheel personal mobility with self-balancing function.

FIG. 2 shows the detailed framework diagram of the main body of the personal mobility vehicle. Referring to both FIG. 1 and FIG. 2, the upper frame 11U consists of a handlebar 111, a horizontal extension rod 112, a seat member 113, and a supporting rod 115. Opposite to the upper frame 11U, the lower frame 11D consists of a supporting frame 116 and a pivot shaft 117. In the structure of the upper frame 11U, a main shaft first end 1111 of the handlebar 111 is provided with a handle portion 1113, and an extension rod first end 1121 of the horizontal extension rod 112 is disposed with a first sleeve 1123, wherein the main shaft second end 1112 of the handlebar 111 is inserted into the first sleeve 1123.

The seat member 113 is disposed on the extension rod second end 1122 through a supporting member 114, used for providing a driver to sit; moreover, as shown in FIG. 1 and FIG. 2, an extension rod second end 1122 of the horizontal extension rod 112 is provided with a second sleeve 1124, wherein one end of the supporting member 114 is inserted into the second sleeve 1124. In addition, the supporting rod 115 of the upper frame 11U includes a supporting rod first end 1151 connected to the extension rod second end 1122 and a supporting rod second end 1152. As shown in FIG. 1 and FIG. 2, the supporting frame 116 of the lower frame 11D is connected to the supporting rod second end 1152 through an extension member 1161 thereof, and downward extends from the supporting rod second end 1152. Moreover, the pivot shaft 117 of the lower frame 11D is disposed in the extension member 1161 and pivotally connected to the supporting frame 116.

In the present invention, the supporting frame 116 mainly consists of the extension member 1161 and a fixing frame 1162. The extension member 1161 is connected to the supporting rod second end 1152 of the supporting rod 115, and provided with two connecting posts 11611, wherein two fixing end of the fixing frame 1162 is connected to the two connecting posts 11611, respectively. Moreover, a first fixing set 11621 consisting of two fixing members is disposed on the middle section of the fixing frame 1162 for pivotally connecting with the wheel 12 through a screwing member. Relative to the first fixing set 11621, a third fixing set 11623 is disposed on the front section of the fixing frame 1162 for being connected with the pneumatic spring set 1D through a screwing member. Besides, a second fixing set 11622 is disposed on the end section of the fixing frame 1162, used for pivotally connecting with the second sprocket wheel 14 and the pedal assembly 16 through an axle and a screwing member.

In this uni-wheel personal mobility vehicle 1 with self-balancing function, the wheel 12 is disposed with an in-wheel motor 121, wherein the in-wheel motor 121 is assembled with a first sprocket wheel 13. In addition, the second sprocket wheel 14 is pivotally connected to the supporting frame 116 and adjacent to the wheel 12, wherein the first sprocket wheel 13 and the second sprocket wheel 14 mesh with a roller chain 15. Therefore, because the pedal assembly 16 is pivotally connected to the second sprocket wheel 14 and the supporting frame 116, a driver can apply a force to the pedal assembly 16 for making the second sprocket wheel 14 and the first sprocket wheel 13 rotate, so as to provide a driving force to the wheel 12. Moreover, when the in-wheel motor 121 is driven by electrical power, the rotation of the in-wheel motor 121 would not simultaneously rotate the pedal assembly 16 because the first sprocket wheel 13 is a ratchet wheel.

Figure 3:
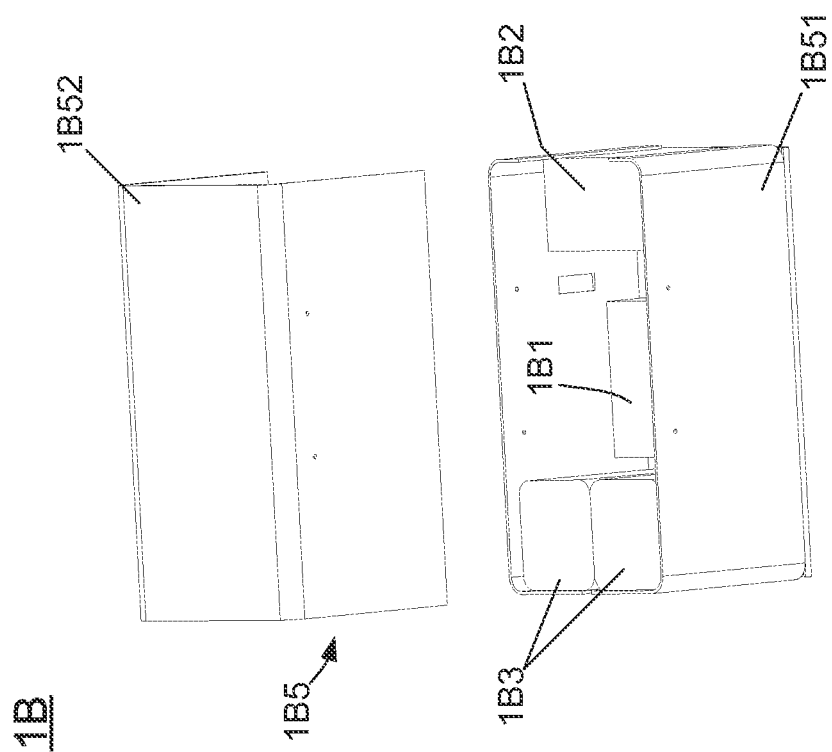
FIG. 3 is an exploded view of an inertial sensing and control driving module of the uni-wheel personal mobility with self-balancing function.

Continuously referring to FIG. 1, and please simultaneously refer to FIG. 3, which illustrates an exploded view of the inertial sensing and control module. As shown in FIG. 1 and FIG. 3, the inertial sensing and control driving module 1B consists of: an accommodation box 1B5, an inertial sensing unit 1B1, a control unit 1B2, and a power supply unit 1B3, wherein the accommodation box 1B5 includes a base 1B51 and a cover 1B52 for accommodating the inertial sensing unit 1B1, the control unit 1B2 and the power supply unit 1B3. The inertial sensing unit 1B1 has an inclinometer and a gyroscope, wherein the inclinometer is used for detecting the tilt (pitch) angle of the upper frame 11U, so as to output a tilt (pitch) angle signal for control purposes; moreover, the gyroscope is used for detecting the absolute pitch rate (angular velocity) of the upper frame 11U, so as to output an angular velocity signal for control purposes.

Inheriting to above descriptions, the control unit 1B2 is coupled to the inertial sensing unit 1B1 for receiving the tilt angle signal and the angular velocity signal, so as to output a controlling signal to the in-wheel motor 121. Moreover, the power supply unit 1B3 is used for providing the electrical power to the inertial sensing unit 1B1, the control unit 1B2 and the in-wheel motor 121. In the present invention, particularly, the inertial sensing and control module 1B would automatically sense the pitch angle and the pitch rate of the upper frame 11U, and then the inertial sensing and control module 1B controls the in-wheel motor 121 to output the balance torque and the auxiliary torque for maintaining the forward and backward balance of the upper frame 11U by using the sensing signal. Moreover, in this personal mobility vehicle 1, the in-wheel motor 121 is able to generate an additional electric torque for being used as an auxiliary pedaling force. In addition, when down hilling, the mechanical energy produced by braking the personal mobility device 1 would be transformed into electrical energy by the control unit 1B2 and then stored in the power supply unit 1B3. Furthermore, when the personal mobility vehicle 1 is not used for transportation purposes and is parked stationary, the personal mobility vehicle 1 can be used as an exercise bike, wherein the mechanical energy produced by the pedaling the pedal assembly 16 can be transformed into electrical energy by the control unit 1B2 and then stored in the power supply unit 1B3.

Next, the detailed introductions for the transmission pulley set 17, the idle pulley set 18, and the spring set 1A will be revealed in following paragraph. As shown in FIG. 1 and FIG. 2, the transmission pulley set 17 is connected between the handlebar 111 and the horizontal extension rod 112, and consists of: a first transmission pulley 171, a transmission pulley fixing member 172, a second transmission pulley 173, a transmission belt 174, and a third transmission pulley 175. The first transmission pulley 171 is connected to the main shaft second end 1112 of the handlebar 111 through a first transmission shaft, and the transmission pulley fixing member 172 is disposed below the horizontal extension rod 112. Moreover, the second transmission pulley 173 is connected to the transmission pulley 1 fixing member 172 through a second transmission shaft, and third transmission pulley 175 is connected to the second transmission wheel 173 by the second transmission shaft, wherein the transmission belt 174 is connected to the first transmission pulley 171 and the second transmission pulley 173 by way of being embedded into the pulley grooves thereof.

The idle pulley set 18 is disposed below the supporting rod 115, and consists of: an idle pulley supporting frame 181, a first idle pulley 182 and a second idle pulley 183, wherein the idle pulley supporting frame 181 is connected to an auxiliary supporting member 1E disposed below the supporting rod 115, and the first idle pulley 182 is disposed on the idle pulley supporting frame 181. The second idle pulley 183 is disposed on the idle pulley supporting frame 181 and opposite to the first idle pulley 182, wherein a transmission cable 184, with either of its ends is connected to the spring set (1A and 1B), is wrapped around the first idle pulley 182, the second idle pulley 183, and the third transmission pulley 175 by way of being embedded into the pulley grooves thereof. Besides, in this personal mobility vehicle 1, the spring set 1A consists of two tension springs, which are connected between the transmission cable 184 and the third fixing set 11623 disposed on the front section of the fixing frame 1162 of the supporting frame 116, used for applying a preliminary tension force to the transmission cable 184, so as to maintain the tension of the transmission cable 184.

Figure 4A:
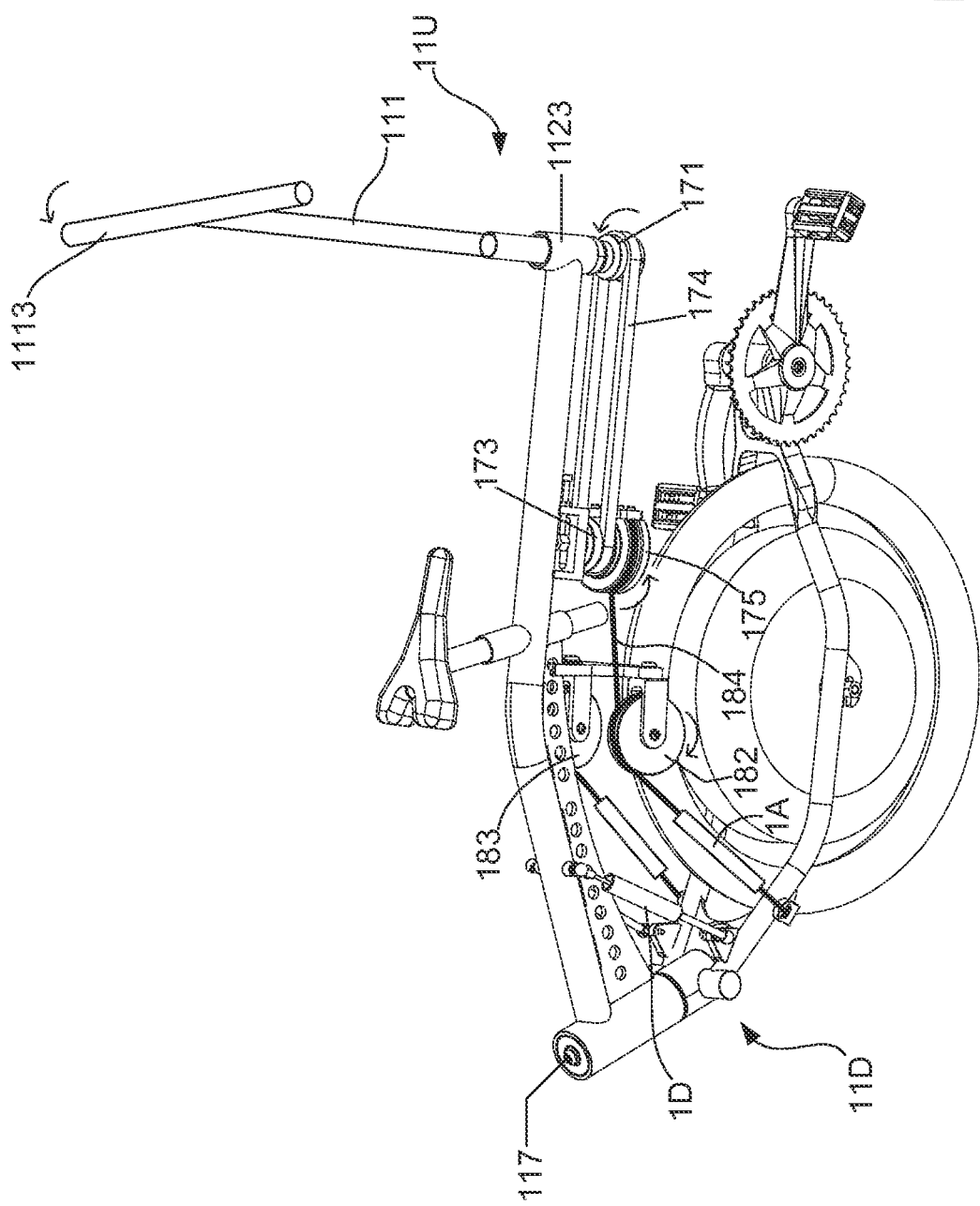
FIGS. 4A and 4B are operation schematic diagrams of the uni-wheel personal mobility with self-balancing function.
Figure 4B:
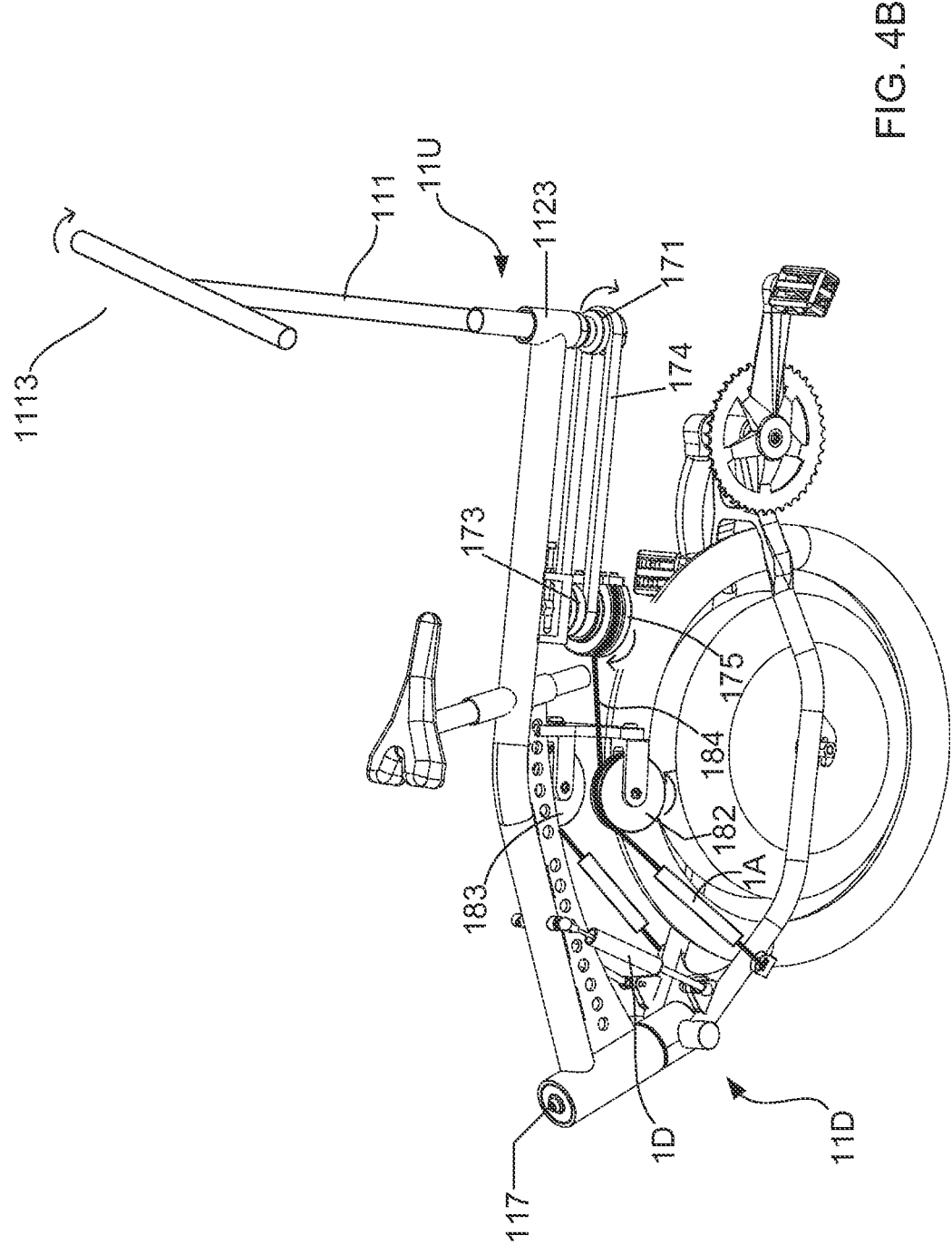

Therefore the basic framework and the constituting elements of the uni-wheel personal mobility vehicle with self-balancing function have been introduced completely and clearly. Next, the technological features of this personal mobility device 1 will be introduced in detail by using some operation diagrams. With reference to FIGS. 4A and 4B, the schematic operation diagrams of the personal mobility vehicle 1 are shown. According to FIG. 4A, after the driver sits on the seat member 113 and controls the handle portion 1113 to rotate the handlebar 111, the handlebar 111 would rotate the transmission pulley set 17 due to the steering torque applied by the driver, and then one side of the transmission cable 184 is pulled by the rotation of the transmission pulley set 17, wherein the transmission pulley set 17 pulls the left side of the transmission cable 184 if the driver turns the handlebar 111 in the clockwise manner; on the contrary, the transmission pulley set 17 pulls the right side of the transmission cable 184 if the driver turns the handlebar 111 in the counter clockwise manner. Therefore, the spring set 1A is pulled by the transmission cable 184 which has been changed direction by the idle pulley set 18, and the unbalance of the spring forces in the spring set makes the upper frame 11U rotate relatively to the lower frame 11D through the pivot shaft 117, which in turn makes the wheel 12 incline to one side thereof. So that, through the relative rotation between the upper frame 11U and the lower frame 11D as well as the inclination of the wheel 12, the driver can change the direction of the personal mobility vehicle 1 by rotating the handlebar 111 similar to steering a conventional bicycle.

Inheriting to above descriptions, when the driver rotates the handlebar 111 of the personal mobility device 1 to change its direction, the detailed actions made by the transmission pulley set 17 and the idle pulley set 18 are described as follows: When the driver rotates the handlebar 111 counterclockwise (i.e., the driver makes a left turn using the handlebar 111), the first transmission pulley 171 would rotate counterclockwise, and the second transmission pulley 173 also rotates counterclockwise due to the motion of the transmission belt 174, and then the third transmission pulley 175 rotates counterclockwise due to the rotation of the second transmission shaft. Furthermore, the right side of the transmission cable 184 is pulled by the rotation of the third transmission wheel 175; meanwhile, the right-side tension spring of the spring set 1A is stretched by the transmission cable 184 which has been changed direction by the first idle pulley 182, and the tension in the left-side spring of the spring set 1A is released due to the decrease in the spring's elongation; therefore, a counterclockwise turning torque produced by the unbalance of the springs' tensional forces is applied on the lower frame 11D, which makes the wheel 12 incline to the left, and makes the upper frame 11U rotates clock wisely relative to the lower frame 11D via the pivot shaft 117 so that the personal mobility vehicle 1 can make a left turn in balancing manner. Meanwhile, because the right-side pneumatic spring 1D is compressed and the left-side pneumatic spring 1D is stretched, the two pneumatic springs 1D would provide a counterclockwise returning torque to the upper frame 11D when the handlebar 111 is released by the driver, so as to maintain the balance and the controllability of the personal mobility vehicle 1.

On the contrary, as shown in FIG. 4B, when the driver rotates the handlebar 111 clockwise (i.e., the driver makes a right turn using the handlebar 111), the first transmission pulley 171 would rotate clock wisely, and the second transmission wheel 173 also rotates clockwise due to the driving of the transmission belt 174, and then the third transmission pulley 175 rotates clockwise due to the rotation of the second transmission shaft. Furthermore, the left side of the transmission cable 184 is pulled by the rotation of the third transmission pulley 175; meanwhile, the left-side tension spring of the spring set 1A is stretched by the transmission cable 184 which has been changed direction by the second idle pulley 183, and the right-side tension spring of the spring set 1A is released due to the decrease in the spring's elongation; therefore, a clockwise turning torque produced by the unbalance of the springs' tensional forces is applied on the lower frame 11D, which makes the wheel 12 incline to the right, and makes the upper frame 11U rotates counterclockwise relative to the lower frame 11D via the pivot shaft 117, so that the personal mobility device 1 can make a right turn in a balancing manner. Meanwhile, because the left-side pneumatic spring 1D is compressed and the right-side pneumatic spring 1D is stretched, the two pneumatic springs 1D would provide a clockwise returning torque to the upper frame 11D when the handlebar 111 is released by the driver, so as to maintain the balance and the controllability of the personal mobility vehicle 1.

In addition, as shown in FIG. 2 and FIG. 3, the personal mobility vehicle 1 further includes the constitutive elements of: a set of supporting pad 1C and an auxiliary supporting member 1E, wherein the set of supporting pad 1C is disposed between the supporting rod 115 and the inertial sensing and control module 1B, and is used for supporting the inertial sensing and control module 1B. The auxiliary supporting member 1E is disposed below the supporting rod 115 and opposite to the inertial sensing and control module 1B, wherein the idle pulley set 18 is fixed below the supporting rod 115 by way of clamping the auxiliary supporting member 1E; moreover, the auxiliary supporting member 1E contains series of holes 1E1 for the purpose of weight reduction.

Thus, the uni-wheel personal mobility vehicle with self-balancing function according to the present invention has been disclosed completely and clearly in the above description. In summary, the present invention has the following advantages:

1. The personal mobility vehicle 1 of the present invention is especially equipped with an inertial sensing and control module 1B, an in-wheel motor 121, a transmission pulley set 17, an idle pulley set 18, and a spring set 1A, therefore the personal mobility vehicle 1 can simultaneously maintain its self-balance when being propelled by the driver's pedaling force or the electrical driving force generated by the in-wheel motor 121; moreover, the driver can also steer the personal mobility vehicle 1 by way of rotating a handlebar 111 similar to steering a conventional bicycle, wherein the rotation of the handlebar 111 would simultaneously drive the transmission pulley set 17, the idle pulley set 18 and the spring set 1A so as to steer and maintain the lateral balance of the personal mobility vehicle 1.

2. Moreover, when this personal mobility vehicle 1 is driven downhill, the mechanical energy produced by braking the personal mobility vehicle 1 would be transformed into the electrical energy via the in-wheel motor 12 and the control unit 1B2 and then stored in the power supply unit 1B3.

3. Furthermore, when the personal mobility vehicle 1 is parked stationary and is not used for transportation purposes, the personal mobility vehicle 1 can be used as an exercise bike, wherein the mechanical energy produced by pedaling the pedal assembly 16 can be transformed into the electrical energy via the in-wheel motor 12 the control unit 1B2 and then stored in the power supply unit 1B3.

The above description is made on embodiments of the present invention. However, the embodiments are not intended to limit scope of the present invention, and all equivalent implementations or alterations within the spirit of the present invention still fall within the scope of the present invention.

What is claimed is:

1. A uni-wheel personal mobility vehicle with self-balancing function, comprising:
   an upper frame, comprising:
      a handlebar, having a main shaft first end and a main shaft second end, wherein the main shaft first end is connected with a handle portion;
      a horizontal extension rod, having an extension rod first end and an extension rod second end, wherein the extension rod first end is connected to the main shaft second end;
      a seat member, being disposed on the extension rod second end through a supporting member, used for providing a driver to sit;
      a supporting rod, having a supporting rod first end and a supporting rod second end, wherein the supporting rod first end is connected to the extension rod second end; and
      an extension member, being connected to the supporting rod;
   a lower frame, being connected to the upper frame and comprising:
      a supporting frame, being connected to the supporting rod second end through the extension member, and downward extending from the supporting rod second end; and
      a pivot shaft, being disposed in the extension member and pivotally connected to the supporting frame;
   a wheel, being pivotally connected to the supporting frame and driven by an in-wheel motor, wherein the in-wheel motor is assembled with a first sprocket wheel, and the first sprocket wheel is a ratchet wheel;
   a second sprocket wheel, being pivotally connected to the supporting frame and adjacent to the wheel, wherein the first sprocket wheel and the second sprocket wheel mesh with a roller chain;
   a pedal assembly, being pivotally connected to the second sprocket wheel and the supporting frame, wherein a pedaling torque applied to the pedal assembly can make the second sprocket wheel and the first sprocket wheel rotate, so as to provide a driving force to the wheel;

a transmission pulley set, being connected between the handlebar and the lateral extension shaft;

an idle pulley set, being disposed under the supporting rod and connected to the transmission pulley set through a transmission cable;

a spring set, being connected between the transmission cable and the supporting frame, used for applying a pre-tension force to the transmission cable, so as to keep the tension of the transmission cable; and an inertial sensing and control module, being disposed on the supporting rod and electrically connected to the in-wheel motor;

wherein the inertial sensing and control module automatically detect the change of the tilt angle and the absolute pitch rate of the upper frame, and then control the in-wheel motor to generate a balancing torque for maintaining the forward and backward balance of the upper frame and an auxiliary torque to electrically assist the propulsion of the vehicle;

wherein after the driver controls the handle portion to rotate the handlebar, the manual torque applied to the handlebar would drive the transmission pulley set to rotate, and then one side of the transmission cable is pulled by the rotation of the transmission pulley set; therefore, one side of the spring set is in turn pulled by the transmission cable in which the direction of the cable has been changed by the idle pulley set, and then the spring set transmits the manual torque to the supporting frame for making the upper frame rotate relative to the lower frame through the pivot shaft, so as to make the wheel incline to one side thereof.

2. The personal mobility vehicle of claim 1, wherein the horizontal extension rod further comprises:
a first sleeve, being formed on the extension rod first end, and the main shaft second end of the handlebar is inserted into the first sleeve; and
a second sleeve, being formed on the extension rod second end, and one end of the supporting member is inserted into the second sleeve.

3. The personal mobility vehicle of claim 1, the spring set consists of two tension springs.

4. The personal mobility vehicle of claim 1, wherein the inertial sensing and control driving module comprises:
an inertial sensing unit, having an inclinometer and a gyroscope, wherein the inclinometer is used for detecting the change of the forward and backward tilt angle of the upper vehicle frame, so as to output a tilt angle signal; moreover, the gyroscope is used for detecting the change of the forward and backward angular velocity of the upper vehicle frame, so as to output an angular velocity signal;
a control driving unit, being coupled to the inertial sensing unit for receiving the tilt angle signal and the angular velocity signal, and used for controlling the in-wheel motor to output the balancing torque and the auxiliary torque by using a controlling signal;
a power supply unit, being used for providing the electrical power to the inertial sensing unit, the control driving unit and the in-wheel motor; and
an accommodation box, being consisted of a base and a cover, and used for accommodating the inertial sensing unit, the control driving unit and the power supply unit.

5. The personal mobility vehicle of claim 1, wherein the driving force provided to the wheel can be transformed into an electrical energy, and the electrical energy being then stored in the power supply unit.

6. The personal mobility vehicle of claim 1, wherein the supporting frame further comprises:
a fixing frame, being connected to the extension member;
a first fixing set, being disposed on the middle section of the fixing frame, used for pivotally connecting with the wheel through a first screwing member;
a second fixing set, being disposed on the front section of the fixing frame, used for pivotally connecting with the second sprocket wheel and the pedal assembly through an axle and a second screwing member; and
a third fixing set, being disposed on the rear section of the fixing frame.

7. The personal mobility vehicle of claim 6, further comprising:
a set of supporting pads, being disposed between the supporting rod and the inertial sensing and control driving module, used for supporting the inertial sensing and control driving module;
a pneumatic spring set, wherein on end of the pneumatic spring set is connected to the third fixing set disposed on the fixing frame and the other end of the pneumatic spring set is connected to the supporting rod, so as to auxiliary supporting the upper frame and the lower frame; and
an auxiliary supporting member, being disposed below the supporting rod and opposite to the inertial sensing and control driving module, and the pulley set is fixed below the supporting rod by way of clamping the auxiliary supporting member.

8. The personal mobility vehicle of claim 7, wherein the auxiliary supporting member is formed with a plurality of holes, and these holes are used for weight reduction and distributing the stress applying on the supporting rod.

9. The personal mobility vehicle of claim 7, wherein the transmission pulley set comprises:
a first transmission pulley, being connected to the main shaft second end of the handlebar through a first transmission shaft;
a transmission pulley fixing member, being disposed below the horizontal extension rod;
a second transmission pulley, being connected to the transmission pulley fixing member through a second transmission shaft;
a transmission belt, being connected to the first transmission pulley and the second transmission pulley by way of being embedded into the pulley grooves thereof; and
a third transmission pulley, being connected to the second transmission pulley by the second transmission shaft;
wherein the first transmission pulley would rotate clockwise when the driver clockwise rotates the handlebar, such that the second transmission pulley clockwise rotates due to the driving of the transmission belt, and the third transmission pulley also clockwise rotates due to the driving of the second transmission shaft;
wherein the first transmission pulley would rotate counterclockwise when the driver counterclockwise rotates the handlebar, such that the second transmission pulley counterclockwise rotates due to the driving of the transmission belt, and the third transmission pulley also counterclockwise rotates due to the driving of the second transmission shaft.

10. The personal mobility vehicle of claim 9, wherein the idle pulley set comprises:
an idle pulley supporting frame, being connected to the auxiliary supporting member;
a first idle pulley, being disposed on the idle pulley supporting frame; and a second idle pulley, being disposed on the idle pulley supporting frame and opposite to the first idle pulley, wherein the transmission cable is connected to the first idle pulley and the second idle pulley by way of being embedded into the pulley grooves thereof;

wherein when the third transmission pulley rotates clockwise due to the driving of the second transmission shaft, the first idle pulley and the second idle pulley would rotate counterclockwise;

wherein when the third transmission pulley rotates counterclockwise due to the driving of the second transmission shaft, the first idle pulley and the second idle pulley would rotate clockwise.

* * * * *